United States Patent [19]

Amin

[11] Patent Number: 4,519,077

[45] Date of Patent: May 21, 1985

[54] DIGITAL PROCESSING SYSTEM WITH SELF-TEST CAPABILITY

[76] Inventor: Pravin T. Amin, 7414 Dew Mist La., Houston, Tex. 77095

[21] Appl. No.: 412,640

[22] Filed: Aug. 30, 1982

[51] Int. Cl.³ .............................................. G06F 11/00
[52] U.S. Cl. ..................................... 371/21; 364/737; 371/25
[58] Field of Search ............................ 371/21, 25, 53; 364/749, 737

[56] References Cited

U.S. PATENT DOCUMENTS

| | | | |
|---|---|---|---|
| 3,161,764 | 12/1964 | Croy | 364/749 |
| 3,234,370 | 2/1966 | Erickson | 364/749 |
| 3,551,663 | 12/1970 | Herron et al. | 364/749 |
| 3,838,264 | 9/1974 | Maker | 371/21 |
| 4,021,656 | 5/1977 | Caudel et al. | 364/709 |
| 4,158,431 | 6/1979 | van Bavel et al. | 371/20 |
| 4,224,676 | 9/1980 | Appelt | 364/749 |
| 4,224,682 | 9/1980 | Kindell et al. | 364/749 X |
| 4,226,272 | 5/1980 | Berglund et al. | 371/53 |
| 4,319,355 | 3/1982 | Mollier | 371/21 |
| 4,437,165 | 3/1984 | Onodera | 364/749 |

OTHER PUBLICATIONS

Rosenfeld, Variable-width Adder for Microprogrammed Computers used for Emulation, IBM Technical Disclosure Bulletin, vol. 15, No. 4, Sep. 1972, pp. 1149-1150.

*Primary Examiner*—Charles E. Atkinson
*Attorney, Agent, or Firm*—Thomas E. Tyson; Leo N. Heiting; Melvin Sharp

[57] ABSTRACT

A digital processing system includes a memory for the storage of both data and instructions of M binary digit widths a N (N≠M) binary digit parallel arithmetic and logic unit and self-test circuitry connected to the memory and connected to the arithmetic and logic unit for summing the numeric value of the contents of the memory into a set of sums that are N binary digit width and for comparing these sums with corresponding checksum constants to determine the integrity of the instructions stored in memory and the integrity of the arithmetic and logic unit operation.

12 Claims, 8 Drawing Figures

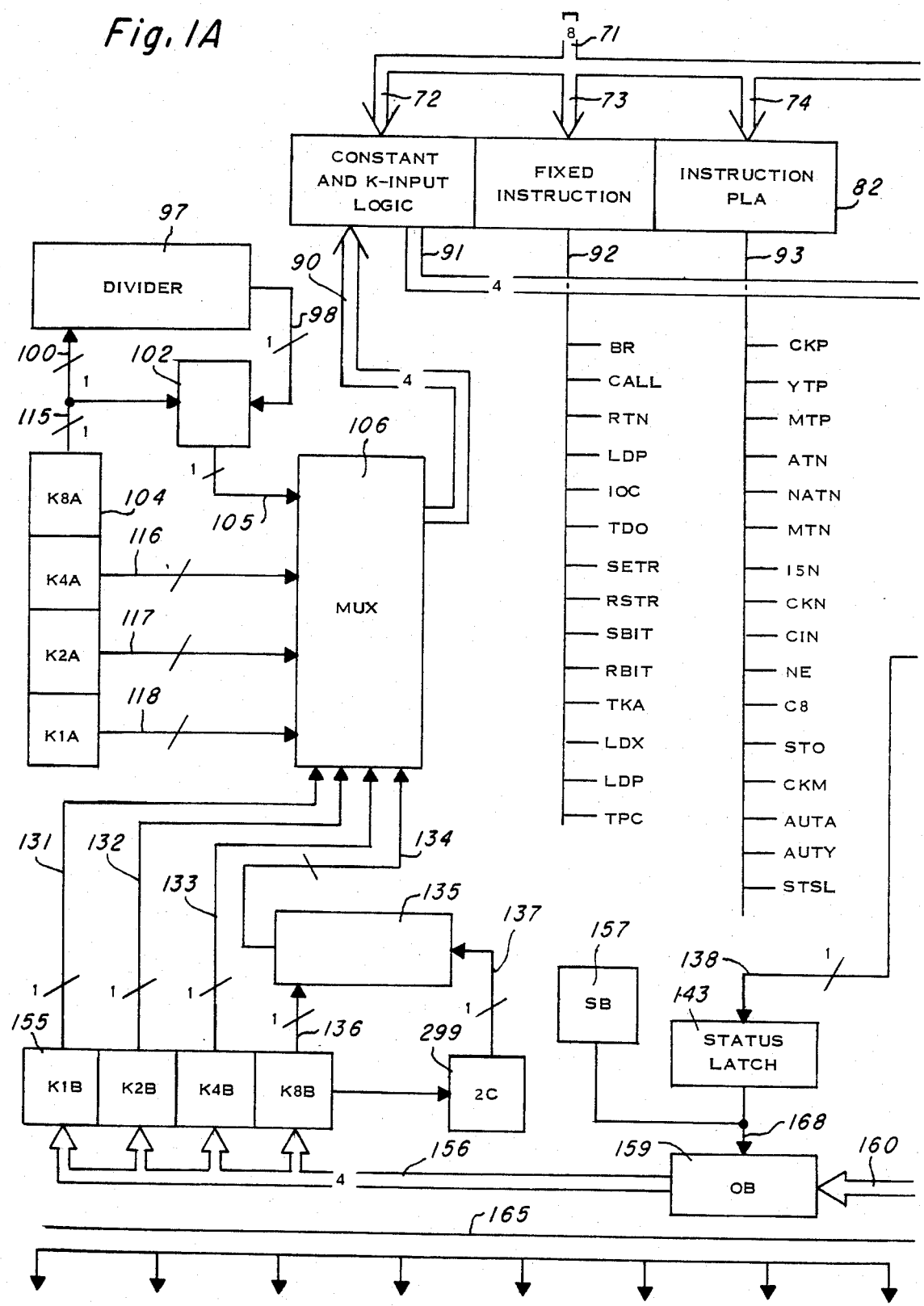

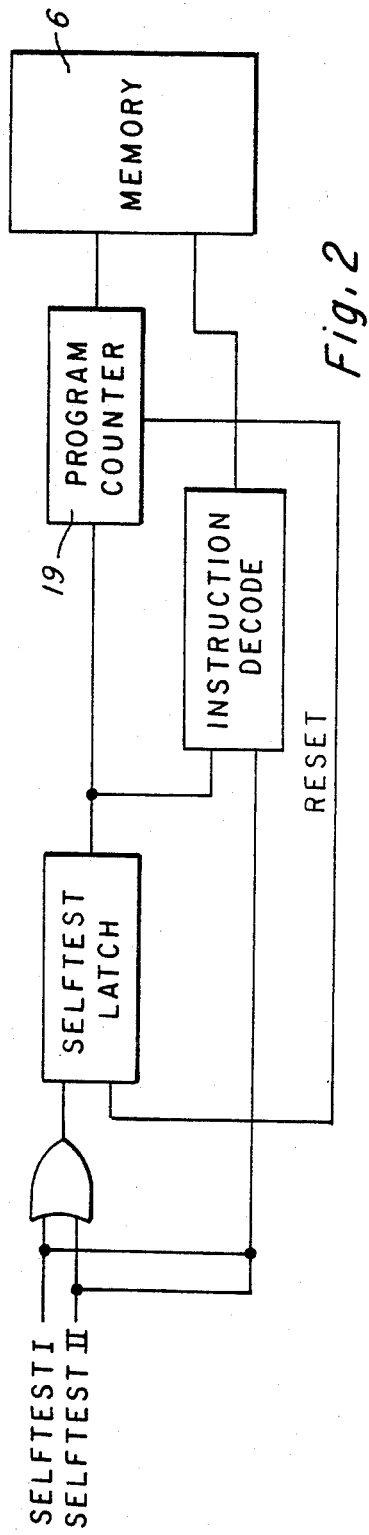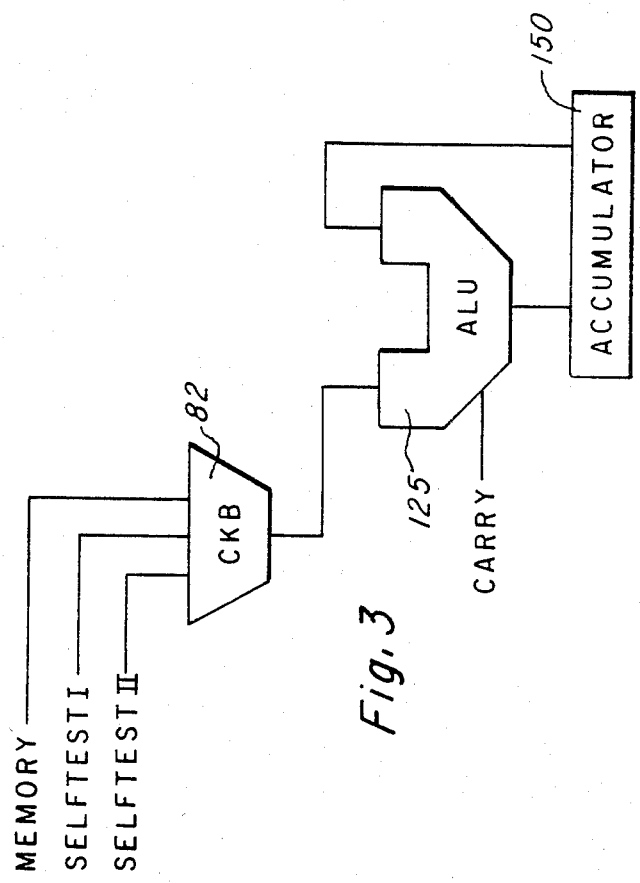

DIGITAL PROCESSING SYSTEM WITH SELF-TEST CAPABILITY

BACKGROUND

1. Field of the Invention

This invention relates to digital processing systems and more particularly to digital processing systems containing self-test circuitry.

2. Description of the Prior Art

Ever since the introduction of the integrated circuit, the functions implemented by integrated circuits have become more and more complex. In the early days of integrated circuits, testing the performance of an integrated circuit was fairly simple and straightforward. However, as the integrated circuits became more complex, the testing of the integrity of circuitry contained in the integrated circuit has become more difficult and time consuming. The introduction of the microprocessor and microcomputer with read-only memory for the storage of instructions and data together with complex arithmetic circuitry has necessitated the requirement for integrated circuits to include circuitry to aid in the testing of the integrated circuit itself. Since this integrated circuit testing is not only required during the manufacture of the integrated circuit itself, but also in the field to determine if the part is still functioning correctly. Systems involved in testing complex integrated circuits can be quite costly and the tests themselves can be quite time consuming. Integrated circuits containing circuitry to assist in these tests can provide a savings in time and expense. An example of a microprocessor with such a self-test feature is illustrated in U.S. Pat. No. 4,158,431 entitled "Self-Test Feature for Appliances or Electronic Devices Operated by Microprocessor" by Michael G. Bavel and Allen J. Shannon, assigned to Texas Instruments Incorporated.

This invention uses a technique known in the prior art. This technique is called checksumming and involves adding the contents of memory to arrive at a total that is then compared to a number stored in memory which represents what this sum should be. The checksum test not only determines the validity of the contents that makes up the sum test, but also determines the correct operation of the circuitry used in adding the numbers to arrive at this sum. When the contents of the memory to be summed consist of words of equal length to the parallel arithmetic logic unit width, the checksum operation is fairly straightforward. If, however, the width of the parallel arithmetic logic unit is different than the width of the instruction words, then the checksum operation becomes difficult.

The object of this invention is to provide a self-test circuit that includes the ability to perform checksum operations on the memory of one binary digit width with a parallel arithmetic logic unit of a different binary digit width.

SUMMARY

In accordance with the present invention, a digital processing system is disclosed that includes a memory for the storage of words of data or instructions which define operations on the data. Each word is M binary digits wide. The digital processing system also includes an N (N≠M) binary digit parallel arithmetic and logic unit that is connected to the memory and performs the operations on data prescribed by the instructions in the memory. Also included in the digital processing system is self-test circuitry connected to both the memory and the arithmetic and logic unit that sums the numeric value of the contents of the memory into several N binary digit wide sums and compares these sums with corresponding check sum constants to determine the integrity of both the memory and the arithmetic and logic unit.

In the preferred embodiment, a digital processing system is provided that includes a data memory for the storage of data words, an instruction memory for the storage of instructions that define operations on the data, a plurality of data paths that are connected to both the instruction memory and data memory, a N binary digit parallel arithmetic and logic unit for performing operations on the data and also connected to the data paths, control circuitry for controlling the access of the instruction and data memories and controlling the arithmetic and logic unit operation, and self-test circuitry connected to the instruction memory, data paths, arithmetic and logic unit and control circuitry. The instructions in the instruction memory are of M binary digit width where M≠N. The self-test circuitry sums the numeric value of the contents of the instruction memory into several N binary digit wide sums and compares these sums with corresponding check sum constants to validate the integrity of the memory and the arithmetic and logic unit.

DESCRIPTION OF THE EMBODIMENT

The preferred embodiment of this description includes hardware designed to provide a checksum reliability test of a program memory in a one chip microcomputer. This technique can be applied to any digital processing system that includes a program memory and an arithmetic and logic unit. In this preferred embodiment, the arithmetic and logic unit of the microcomputer is used to compute a checksum constant for the program memory. This checksum test exercises the program memory and data paths in addition to exercising the arithmetic and logic unit to verify that the program stored in memory and the arithmetic logic unit are functioning properly. This checksum test is not intended to replace a multiprobe test used to check the total integrated circuit after manufacture. The checksum test does provide an indication as to the reliability of the program memory, arithmetic and logic unit and data paths in the microcomputer. This test can be executed before the multiprobe test during the manufacturing process and, in addition, this test can be implemented when the microcomputer has been installed into another system at a later date to indicate reliability. While this test is not totally indicative of the reliability of the microcomputer, the test does produce a high confidence level of reliability for a very small additional cost of hardware and software.

Figure 1A:
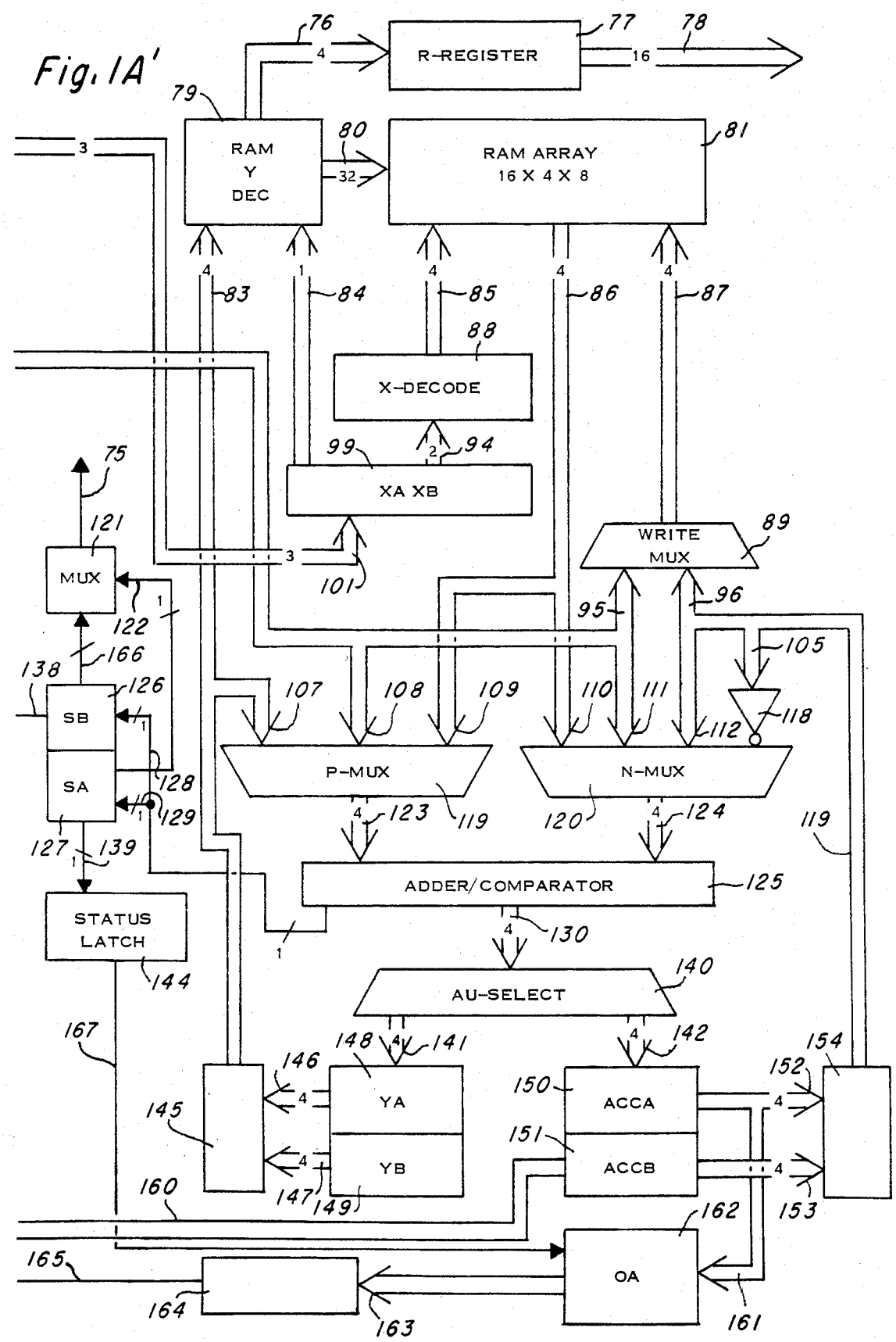

This checksum test is implemented on a Texas Instruments TMS 1000 type of architecture. However, it should be obvious to one skilled in the art that this invention may be applied to any microcomputer architecture that includes an arithmetic and logic unit and a memory. Specifically this checksum test is implemented on a processor version of the TMS1000 that is disclosed in U.S. patent application Ser. No. 216,113 herein incorporated by reference. FIGS. 1A, 1A', 1B and 1B' illustrate a block diagram of this processor microcomputer. It should be noted that processor nature of this microcomputer is not necessary for this checksum test implementation and therefore can be ignored. In addition, many features of this dual processor architecture which are illustrated in the block diagram are not required for the explanation of this invention and therefore these extra features will not be discussed.

FIG. 1A illustrates the two inputs to the processor. The inputs are routed through a multiplexer 106 via lines 90 into the constant and keyboard input logic circuitry illustrated by block 82. This logic 82 provides an input via line 91 to the arithmetic and logic unit (ALU) 125 shown in FIG. 1A'. The constant and keyboard input logic 82 receives the output from the program ROM 6 (in FIG. 1B') via line 71. This instruction word from ROM 6 includes three types of data. The first type is the constant that is inputted via line 72. The second is the fixed instruction inputted via line 73. Line 92 illustrates the types of fixed instructions included in this architecture. Line 74 inputs the instructions to be coded by the instruction program logic array. These instructions are illustrated by line 93. Only the constant from the ROM 6 is inputted into the ALU 125 via line 91. This constant is 4 bits wide. The word from ROM 6 is 8 bits wide. This invention permits for both 4 bit halves of the instruction word in ROM 6 to be inputted into the arithmetic and logic unit 125 via line 91.

The arithmetic and logic unit (adder/comparater) 125 is illustrated in FIG. 1A'. Line 91 connects with line 108 to become an input into the positive multiplexer 119 to provide an input of 4 bits over lines 123 into the arithmetic and logic unit 125. This invention also requires that the accumulator represented by 150 and 151 be inputted into the arithmetic and logic unit 125 via the negative multiplexer 120. The accumulators 150, 151 are selected by the multiplexing logic 154. This multiplex logic 154 selects lines 152 or 153 according to which accumulator is being accessed. Lines 119 connect the multiplexer 154 to the negative multiplexer 120 together with line 112. In normal operation of the checksum test, a portion of ROM 6 is inputted into positive multiplexer 119 to be added with the contents of the accumulator 150 or 151 which is inputted into the negative multiplexer 120. The sum from the arithmetic and logic unit 125 is then placed through the arithmetic and logic unit select logic 140 by lines 130 back into the accumulator 150 or 151 via line 142. This sequence is repeated until all portions of the ROM are summed. It should be noted that the summing of the four bits will produce a carry from the arithmetic and logic unit 125. The carry will be inputted into the status latches 126 and 127 for both processors via lines 128 and 129 but may be ignored.

Figure 1B:
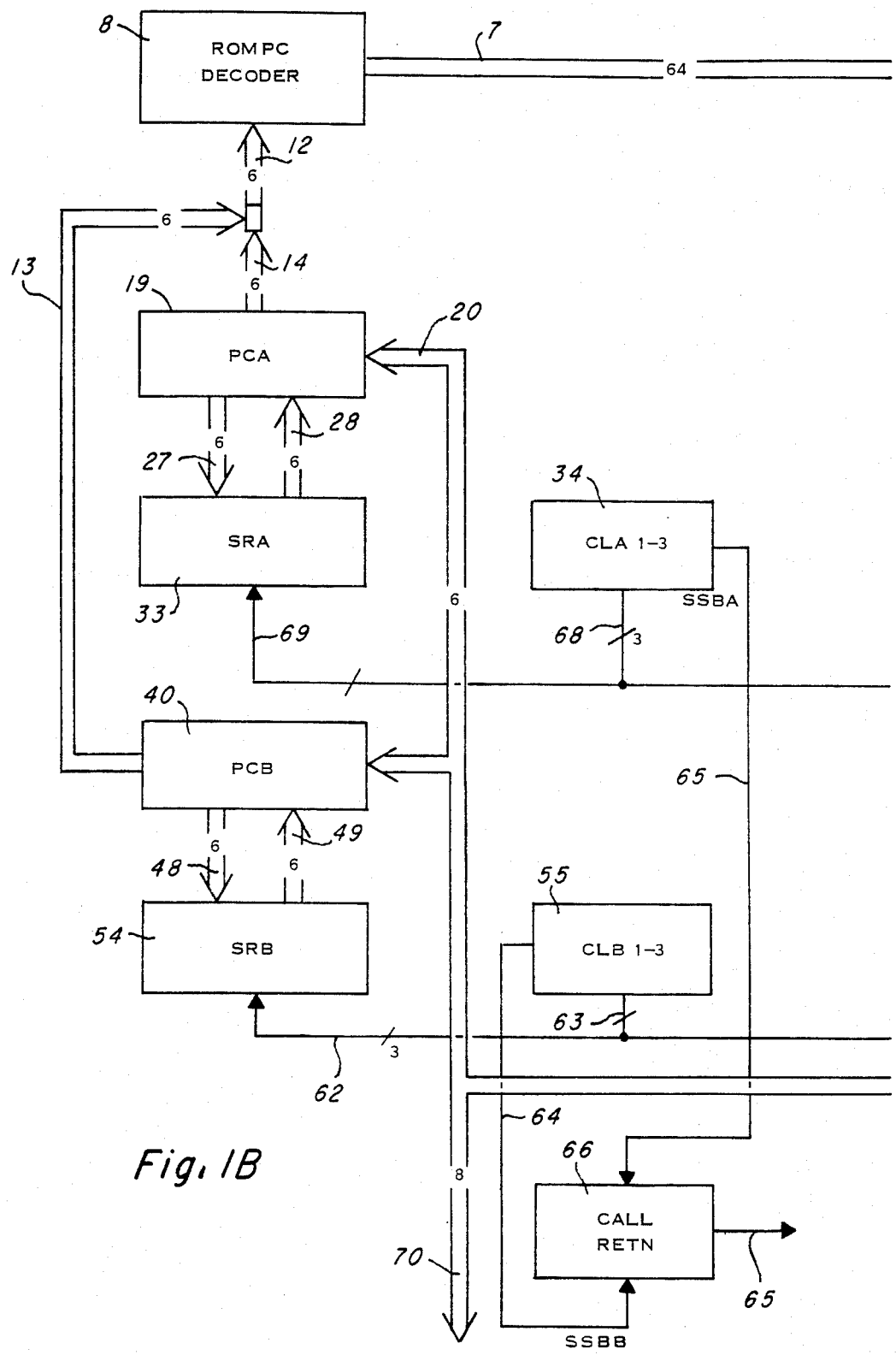
Figure 1B:
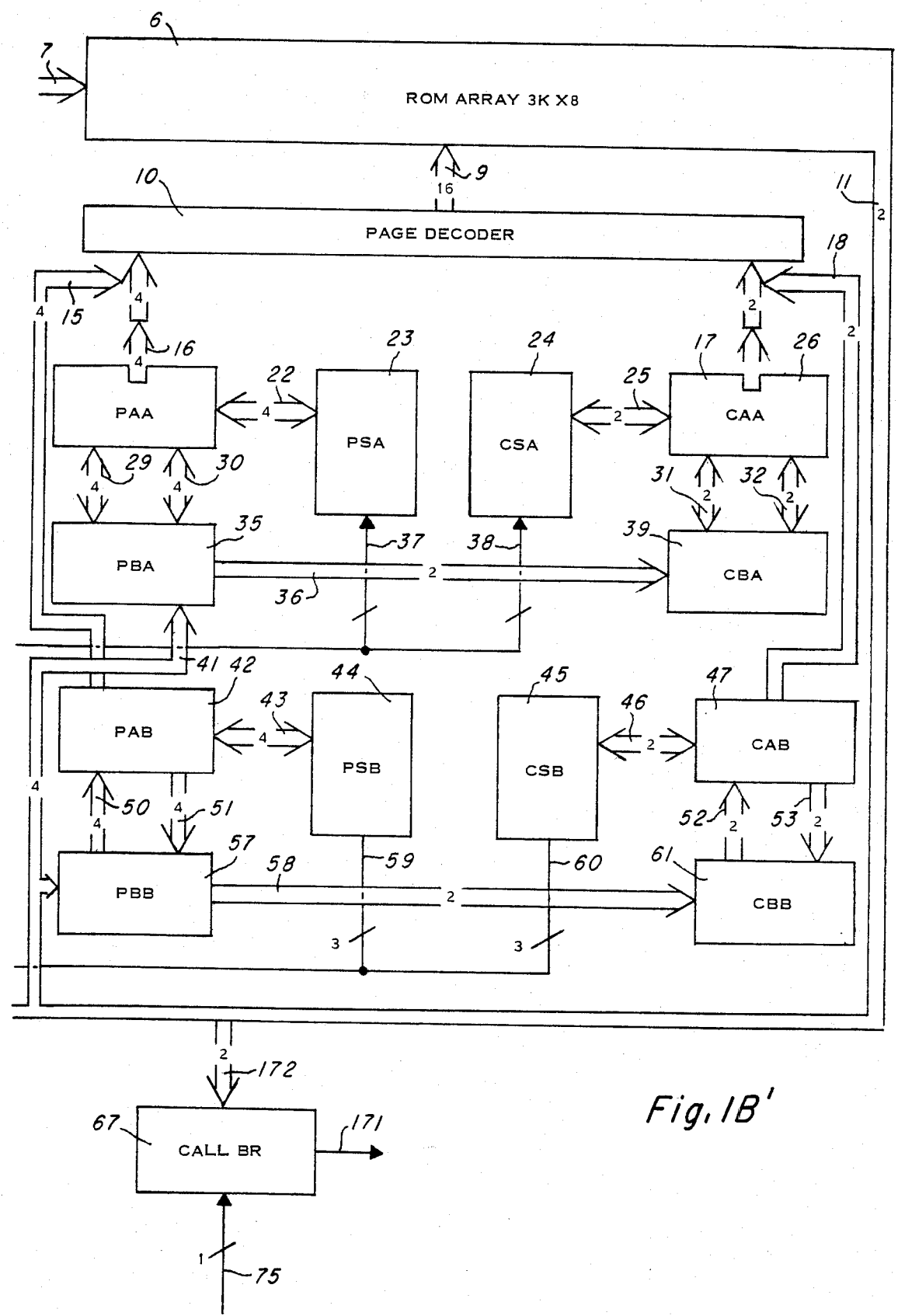

The program counter 19 for processor A is illustrated in block form in FIG. 1B. The contents of this program counter is inputted via lines 14 and 12 into the ROM program counter decoder 8. This program counter decoder 8 outputs 1 of 64 location addresses on line 7 input to ROM 6 illustrated on FIG. 1B. In this specific TMS 1000 architecture the ROM 6 is organized into three chapters of 16 pages per chapter and 64 locations per page for a total of 3K×8 bits of storage. Referring back to FIG. 1B, the program counter 19 is a pseudo random counter that does not count in the normal binary fashion, i.e., 00,01,10,11, etc. Rather, it shifts a 1 through the shift register and then shifts the 0 and so forth. The sequential count for the shift register is 000,001,010,100,111, etc, therefore, when the count for all 64 pages is complete, the program counter 19 will contain zeros. This characteristic is later used in the checksum test to increment the page register 16 and the chapter register 17.

A partial block diagram of the self-test circuitry is illustrated in FIG. 2. Two different self-test instructions are contained in memory 6, the first instruction, SELFTEST I, sums the least significant 4 bits of the 8 bit instruction word. The SELFTEST II sums the remaining 4 bits of each instruction word in the memory 6. These instructions are decoded through the instruction decoder which is connected to an OR gate. The output of the OR gate is connected to the self-test latch. The self-test latch indicates the execution of self-test in the digital processing system. The output of the self-test latch is connected to both the program counter and the instruction decode. The connection to the self-test execution disables all the instruction decode capabilities with the exception of the microcode instructions that are used to control the arithmetic and logic unit 125. The self-test latch output is connected to the program counter 19 to initialize a program counter, the page register, the chapter register and to begin the summiing task by causing the program counter to sequence through all addresses. Since this program counter is a pseudo random program counter in the manner described and contains feedback circuitry, the program counter is initialized in a 0 state and starts counting by shifting a 1 through as previously discussed. When the program counter returns to the 0 state, 0 state detection circuitry contained in the program counter will reset the self-test latch ending that portion of the self-test. When the self-test latch is reset, the instruction decode is then enabled again and the next instruction is read from memory 6.

FIG. 3 illustrates the self-test circuitry for the summing of the memory contents. The actual memory data is inputted into the arithmetic and logic unit 125 through the constant keyboard logic 82. All 8 bits of memory are available to the constant keyboard logic 82. Since the memory is 8 bits wide and only 4 bits can be read into the arithmetic logic unit 125, the memory word must be divided into two portions. This is done by the two different self-test instruction words, SELFTEST I and SELFTEST II. SELFTEST I selects the least significant 4 bits of the memory to be inputted into the arithmetic logic unit 125. SELFTEST II selects the most significant 4 bits of memory to be inputted into the arithmetic logic unit 125. The arithmetic and logic unit 125 sums each of the 4 bits from the constant keyboard logic 82 with the contents of the accumulator 150 and stores the contends back into the accumulator 150. At the conclusion of the summing operation, the contents of the accumulator is compared to a constant stored in memory to determine if the test has passed.

Figure 4:
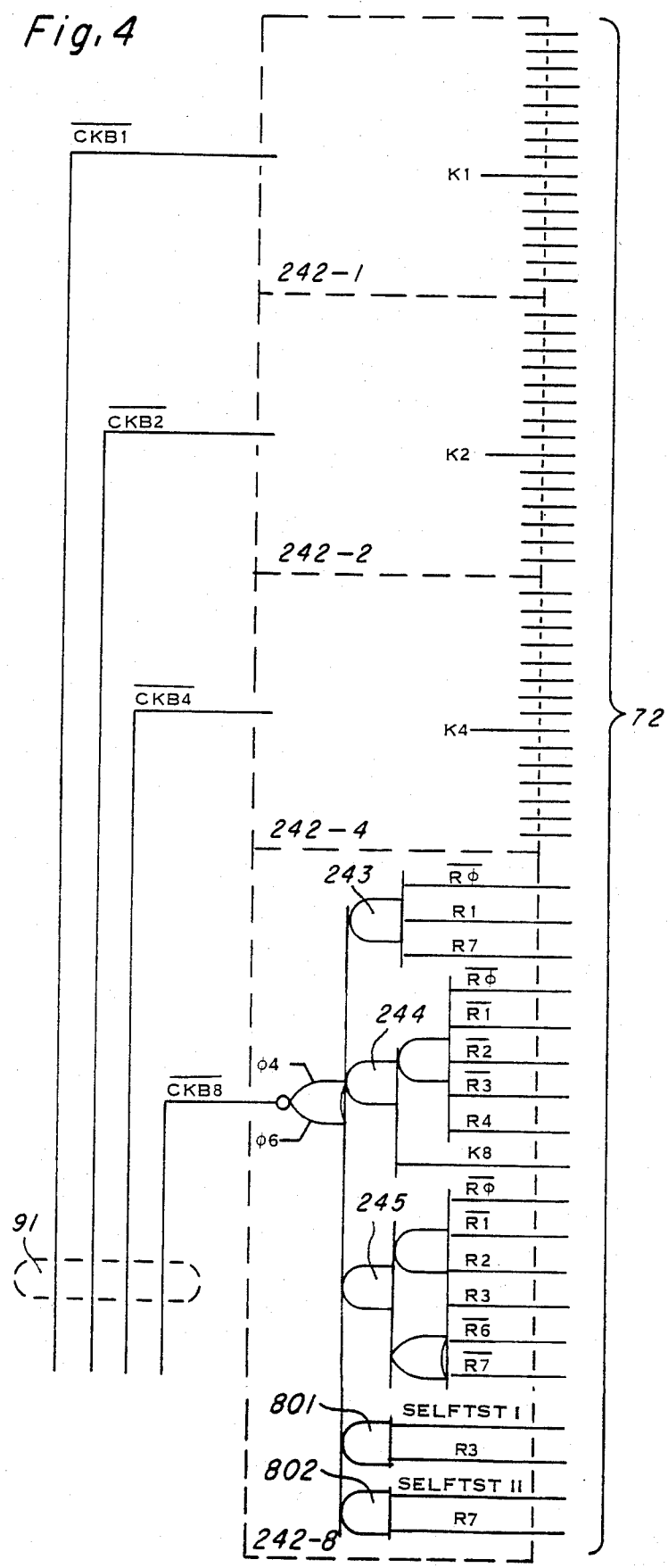

The circuitry for the constant keyboard logic 82 is illustrated in FIG. 4. The constant keyboard logic 82 consist of 4 similar sections shown as 242-1 through 242-8 to multiplex 4 bits of data onto lines 91. Section 242-8 is illustrated and is similar to the other sections not illustrated 242-1 to 242-4. Section 242-8 contains a complex gate made up of 5 basic gate components. Gate component 243 is used to load lines 91 with the 4 bit constant from the ROM memory 6. Complex gate component 244 inputs the keyboard data from the keyboard circuitry to lines 91. Complex gate component 245 loads lines 91 from the RAM memory 81. Components 801 and 802 are used by the self-test routine to load lines 91 with the upper or lower 4 bits of the instruction bus.

Figure 5:
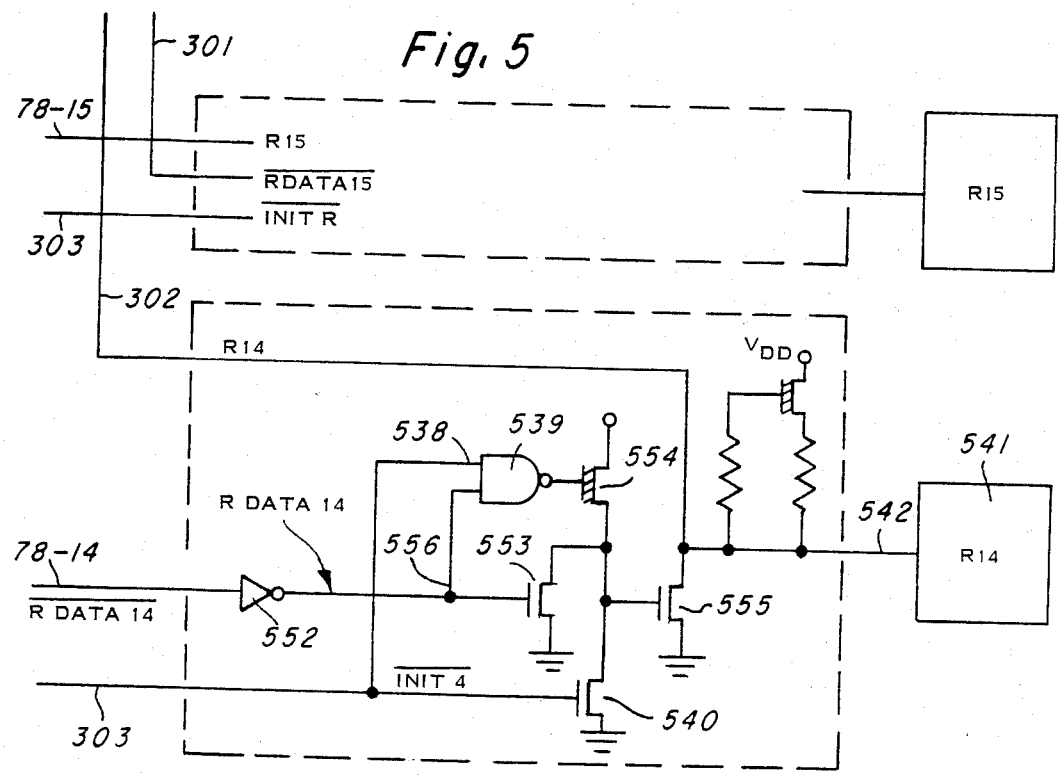

FIG. 5 illustrates the registers 77 used to output data. FIG. 5 contains illustrations of Register bits 15 and 14. Specifically, register bits 15 and 14 are implemented to input and output data. Specifically an inputted can be applied to connection pad 541 which is input via line 302 into the internal circuitry of the microcomputer. If it is desired, a condition circuit can be placed in the self-test circuit to require that an input be present on pad 541 in order to initiate self-test. If the input is not present, the SELFTEST I and SELFTEST II instructions would be treated as NO-OPs (no operations).

Figure 6:
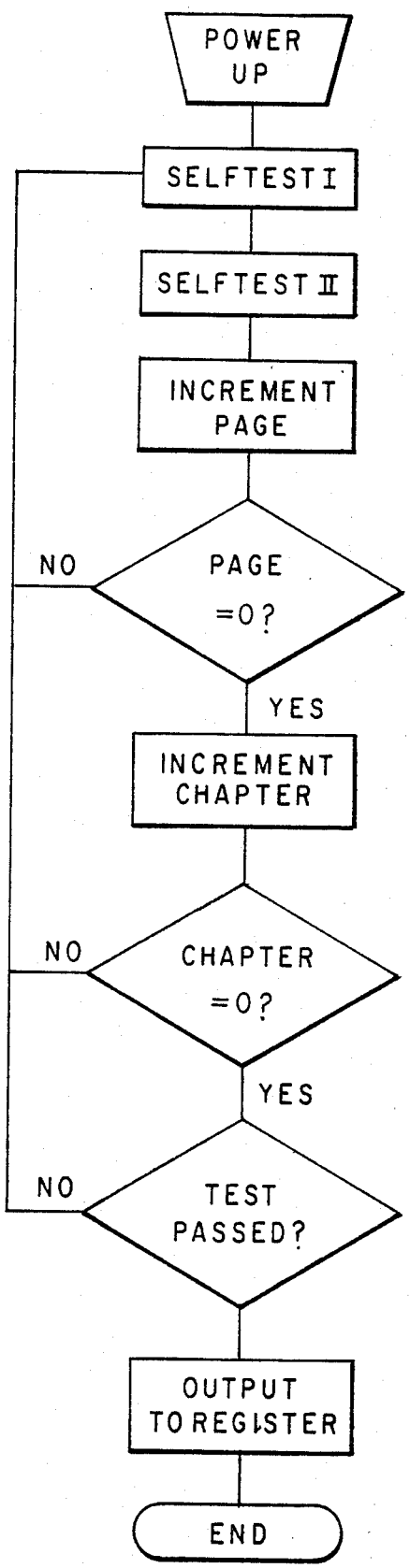

FIG. 6 is an illustration of a flow chart for the self-test execution. Upon power up, the microcomputer will initialize itself and begin instruction execution at program counter address 0, page register 0 and chapter address 0. The first instruction to be executed will be the SELFTEST instruction which will result in the instruction decode circuitry being disabled, the program counter set to count through a complete set of 64 program counter addresses. In addition this SELFTEST I instruction will load the lowest significant 4 bits of the instruction word through the constant keyboard logic 82 into the arithmetic and logic unit 125. The accumulator in the initilization stage has been also initialized to 0 so that when the first 4 bit portion of instruction word is added in the arithmetic and logic unit 125 it will be added with the accumulator contents. From that point on, the successive instructions will be added to the contents of the accumulator. The carry or overflows will be ignored. At the end of the execution of this instruction, SELFTEST II instruction is executed which performs the same operations on the upper significant 4 bits of the instruction word for that page. At the completion of the SELFTEST II instruction, the page is incremented, the microcomputer then examines the page address to determine if it is equal to 0. If it is not equal to 0, then SELFTEST I is executed again. If the page is equal to 0, meaning that all the pages have been summed in the accumulator, then the chapter register is incremented. If the chapter register is equal to 4 (for this preferred embodiment) then all of the available memory in ROM 6 has been summed. If the chapter address is not equal to 4, then the software is looped back to continue the self-test execution. After summing of all memory, the self test compares the contents of the accumulator with a constant in memory to determine if the test is passed. If the test has passed, then there is an output to a register 77 to indicate to the operator that the test has passed. If the test has not passed, the test is reinitialized and begun again. In this manner the operator can detect a test failure by noticing that the microcomputer is in a loop. An alternative to this looping would be the outputting of another pattern to the register 77 to indicate a test failure.

This invention permits the operator to perform the checksum test on a unique portion of the instruction word in memory. In other words, each bit location in the instruction memory is involved in the summing operation once. The techniques of this invention may be applied to other memories of different lengths, such as a 9 bit memory width and a 4 bit arithmetic and logic unit. For this situation, the memory word is divided into three portions: the first and second portions of 4 bits and the third portion of 1 bit. It should then be obvious to one skilled in the art that there are many variations possible for this invention applicable to memory words and arithmetic and logic unit widths of different sizes.

What is claimed is:

1. A digital processing system comprising:
   a memory means for the storing of words containing data and instructions that define operations on said data, each word contains M binary digits;
   an N (where N is less than M) binary digit parallel arithmetic and logic unit connected to said memory means and for performing said operations; and
   self-test means connected to said memory means and said arithmetic and logic means for summing the numeric value of the contents of said memory means into a plurality of binary digital sums and comparing said sums with corresponding constants, said self test means includes: first self test means for controlling the testing of a first portion of the M binary digits, second self test means for controlling the testing of a second portion of the M binary digits, and accumulator means for accumulating the results of the testing of the first and second portions.

2. A digital processing system according to claim 1, wherein said constants are stored in said memory means.

3. A digital processing system according to claim 2, wherein said self-test means includes means to disable the response of the arithmetic and logic unit to the instructions stored in said memory means.

4. A digital processing system according to claim 3, wherein said self-test means includes means to separate the numeric value of the contents of said memory means into separate N binary digit wide portions to be added to compute said plurality of N binary digit sums.

5. A digital processing system according to claim 4, wherein said self-test means includes a latch that indicates when the digital processing system is performing self-test.

6. A digital processing system according to claim 5, wherein said self-test means includes an instruction stored in said memory means that defines an operation which sets said latch and defines the operation that result in the summing of the numeric value of the contents of said memory means into a plurality of binary digit sums and the comparison of said sums with said corresponding constants.

7. A digital processing system comprising:
   a first memory means for the storage of data;
   a second memory means for the storage of instructions that define operations on said data, said instructions containing M binary digits;
   a plurality of data paths connected to said first and second memory means;
   a N (where N less than M) binary digit parallel arithmetic and logic unit for performing said operations on said data and connected to said data paths;
   a control means connected to said data paths for controlling the access of said instruction and said data and connected to said arithmetic and logic unit for controlling the performance of said operations on said data; and
   self-test means connected to said second memory means, said data paths, said arithmetic and logic unit, and said control means, said self-test means for summing the numeric value of the contents of said second memory means into a plurality of binary digit sums and for comparing said sums with corresponding constants, said self test means include: first self test means for controlling the testing of a first portion of the M binary digits, second self test means for controlling the testing of a second portion of the M binary digits, and accumulator means for accumulating the results of the testing of the first and second portions.

8. A digital processing system according to claim 7, wherein said constants are stored in said second memory means.

9. A digital processing system according to claim 8, wherein the said self-test means includes means to disable said control means.

10. A digital processing system according to claim 9, wherein said self-test means includes means to alter said data paths to load a plurality of unique N binary digit portions of each of said M binary digit instructions of said second memory means into said arithmetic and logic unit.

11. A digital processing system according to claim 10, wherein said self-test means includes a latch to signify the performance of self-test operations.

12. A digital processing system according to claim 11, wherein said self-test means includes an instruction to initiate the sequence of self-test operations.

* * * * *